United States Patent
McLean

(10) Patent No.: US 8,850,211 B2
(45) Date of Patent: Sep. 30, 2014

(54) METHOD AND APPARATUS FOR IMPROVING CODE AND DATA SIGNING

(75) Inventor: Ivan H. McLean, Solana Beach, CA (US)

(73) Assignee: QUALCOMM Incorporated, San Digeo, CA (US)

(*) Notice: Subject to any disclaimer, the term of this patent is extended or adjusted under 35 U.S.C. 154(b) by 402 days.

(21) Appl. No.: 12/430,553

(22) Filed: Apr. 27, 2009

(65) Prior Publication Data

US 2010/0275026 A1    Oct. 28, 2010

(51) Int. Cl.
| | | |
|---|---|---|
| *G06F 21/00* | (2013.01) | |
| *G06F 21/12* | (2013.01) | |
| *G06F 21/45* | (2013.01) | |
| *H04L 9/32* | (2006.01) | |

(52) U.S. Cl.
CPC ............... *G06F 21/12* (2013.01); *G06F 21/45* (2013.01); *H04L 9/3236* (2013.01); *H04L 9/3247* (2013.01)
USPC .............................. 713/176; 713/189; 726/18

(58) Field of Classification Search
CPC ..... H04L 9/3236; H04L 9/3247; G06F 21/45; G06F 21/12
USPC ..................... 713/189, 176; 726/18
See application file for complete search history.

(56) References Cited

U.S. PATENT DOCUMENTS

| | | | | |
|---|---|---|---|---|
| 6,438,600 | B1* | 8/2002 | Greenfield et al. ........... | 709/229 |
| 6,694,434 | B1* | 2/2004 | McGee et al. ................ | 713/189 |
| 6,820,200 | B2* | 11/2004 | Takeuchi et al. .............. | 713/179 |
| 6,973,305 | B2* | 12/2005 | McLean ........................ | 455/425 |
| 7,099,663 | B2* | 8/2006 | Lundblade et al. ........... | 455/425 |
| 7,140,004 | B1* | 11/2006 | Kunins et al. ................. | 717/125 |
| 7,353,199 | B1* | 4/2008 | DiStefano, III ................ | 705/37 |
| 7,684,792 | B2* | 3/2010 | Lundblade et al. ........... | 455/425 |
| 7,761,354 | B2* | 7/2010 | Kling et al. ..................... | 705/35 |

(Continued)

FOREIGN PATENT DOCUMENTS

| | | |
|---|---|---|
| EP | 0778522 A2 | 6/1997 |
| EP | 1336913 A2 | 8/2003 |

(Continued)

OTHER PUBLICATIONS

International Search Report—PCT/US2010/032428, International Search Authority—European Patent Office—Jul. 14, 2010.

(Continued)

*Primary Examiner* — Techane Gergiso
*Assistant Examiner* — Thomas Ho
(74) *Attorney, Agent, or Firm* — James T. Hagler

(57) ABSTRACT

Methods and computing devices enable code and/or data software on computer devices to be verified using methods and signatures which can be updated by a signing server after distribution. Updated verification methods and signatures may be provided in a second signature file. When a computing device unpacks an application for execution it may check whether a second signature file is associated with the application file. If not it may connect to a signing server to request a second signature file for the software. The signing server then may request information related to the software sufficient to determine if the software is trustworthy. If determined to be trustworthy, the signing server can send a second signature file to the computer device for use in verifying the software henceforth. The second signature file may include new or modified verification methods and a new signature.

95 Claims, 10 Drawing Sheets

(56) References Cited

U.S. PATENT DOCUMENTS

| | | | |
|---|---|---|---|
| 7,822,683 B2* | 10/2010 | Jakstadt et al. | 705/40 |
| 7,908,660 B2* | 3/2011 | Bahl | 726/25 |
| 2006/0107323 A1* | 5/2006 | McLean | 726/23 |
| 2007/0174282 A1 | 7/2007 | Matsuda et al. | |
| 2009/0240717 A1* | 9/2009 | Mimatsu | 707/101 |

FOREIGN PATENT DOCUMENTS

| | | |
|---|---|---|
| JP | 2001350405 A | 12/2001 |
| JP | 2002207428 A | 7/2002 |
| JP | 2007188184 A | 7/2007 |
| WO | WO2006128876 A2 | 12/2006 |

OTHER PUBLICATIONS

Written Opinion—PCT/US2010/032428—ISA/EPO—Jul. 14, 2010.

Sato M, "A Construction Example of a large-scale Time Stamp Service System," the 69th National Conversion of IPSJ collected papers, Interface and human society, Mar. 2007, pp. 4-321-4-322, 1H1.

\* cited by examiner

METHOD AND APPARATUS FOR IMPROVING CODE AND DATA SIGNING

FIELD OF THE INVENTION

The present invention relates generally to computer security technologies, and more particularly to methods and apparatus for improving the method in which code and data files are verified and signed.

BACKGROUND

In computer systems a variety of mechanisms and systems are implemented to protect against malware and software that has been modified without authorization. One of the most common methods is to provide a digital signature of the code or data which is checked before the code or data are executed or accessed. Methods for digitally signing code and data are widely used with software written for mobile devices, such as cellular telephones, due to the need to protect the security of cellular networks and the limited ability of mobile devices to implement malware protection software.

Code or data that is integrity protected by a digital signature is "signed" by a certifying authority or "signing server" before it is sold or otherwise distributed. Signed code or data includes a digital signature which contains an encrypted value that can be used in conjunction with a verification algorithm to verify that the code or data is the same as when it was "signed." As illustrated in FIG. 1, in a typical implementation a computing device (e.g., a mobile device) confirms that an application is trustworthy by: unpacking the code or data to obtain the signature, step 2; running a hash function over the application code and/or data (or performing some other verification algorithm), step 4; decrypting the signature to obtain a hash value contained within the signature, step 6; confirming that the signature is signed by a valid certificate, step 8; and comparing the resulting hash to the hash contained within the digital signature, step 10. If the two hash values are equal, test 12, the code or data is trusted. Computers, such as mobile devices, may include a certificate chain in memory to enable them to decrypt the digital certificate and confirm that the signature is signed by a valid certificate. If the signature was signed by a valid certificate and the hash values are equal (i.e., test 12="Yes"), the code or data are trusted and the client may execute the code or use the data.

Signing code and data provides an effective security shield in most cases. However, this security regime is static, and thus is unable to respond to changes in the security environment. For example, if a weakness is discovered in the implementation of any of the client core cryptographic components or if a fresh vulnerability against a core hash function or public key algorithm is discovered, or if a logic or application-level error is uncovered, the client device may not be able to protect itself from such vulnerabilities. To make matters worse, this situation may occur several years after the code and data were completed and distributed and years after the client device was commercially deployed.

SUMMARY

Various embodiments provide methods and systems for updating and improving the signing and verification processes used to verify executable computer files and data files. The various embodiments provide a flexible mechanism for strengthening existing code and data signing systems by providing an updateable environment of a signing server accessible by client computer devices. This capability provides systems and methods for recovering from the discovery of what would normally amount to catastrophic weaknesses in code signing systems. The various embodiments include a signing server configured to determine whether software on client computer devices is trustworthy and provide updated verification methods and signatures to client computers. In an embodiment the updated verification methods and signatures may be provided in a second signature file (referred to herein as a "signature 2 file"). When a computing device unpacks an application for execution it may check whether a second signature file is associated with the application file. If not the computing device may connect to a signing server to request a second signature file for the software. The signing server then may request information from the computing device related to the software sufficient to enable it to determine if the software is trustworthy. If the software is determined to be trustworthy, the signing server can send a second signature file to the computer device for use in verifying the software henceforth. The second signature file may include new or modified verification methods and a new signature.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1:
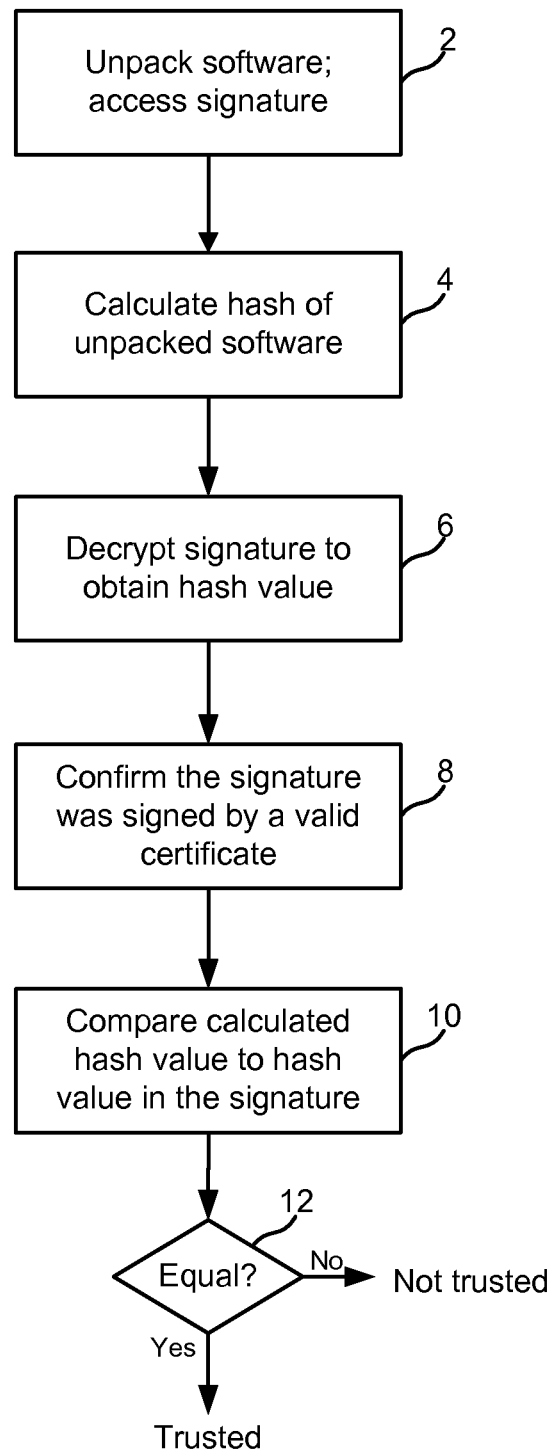
FIG. 1 is a process flow diagram of a prior art method for verifying signed code and data.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In this description, the terms "exemplary" is used to mean "serving as an example, instance, or illustration." Any implementation described herein as "exemplary" is not necessarily to be construed as preferred or advantageous over other implementations.

In this description, the terms "signing" and "signature" to refer to methods for enabling computing devices to determine whether software code or data or combinations of code and data (collectively "software") have been modified since being verified by a signing authority, including both methods well known in the art and methods enabled by the various embodiments. Such well-known methods typically involve generating a hash or "fingerprint" value that essentially condenses the code, data or code and data into a large number, such as a 20 byte value, that is nearly unique to the particular information contained in the code and/or data. This hash or fingerprint value is then encrypted using a private key that can be decrypted by a public key stored in a client device according to the well-known PKI encryption scheme. The encrypted hash or fingerprint value is referred to as a signature and the process of generating the signature is generally referred to as signing. A number of different types of hash algorithms are used, and the various embodiments enable further changes and refinements to such algorithms, and therefore, the use of the terms "signing" and "signature" are not intended to limit the scope of description or the claims to any particular form of cryptographic process, hash function or verification algorithm.

The various embodiments can be applied to signing and verifying application software instructions (commonly referred to as "code"), data processed or used by applications, and application files including both code and data. Therefore, the term "software" is used herein to refer generally to both code and data in the alternative, as well as to code and data in the conjunctive. References to software in the following description and the claims should not be construed as excluding data or requiring executable instructions.

As used herein, the terms "mobile device", "mobile handset", "handset" and "handheld device" refer to any one or all of cellular telephones, personal digital assistants (PDAs) with wireless modems, wireless electronic mail receivers (e.g., the Blackberry® and Treo® devices), multimedia Internet enabled cellular telephones (e.g., the iPhone®), wireless telephone receivers and similar personal electronic devices. In a preferred embodiment, the mobile device is a cellular handset device (e.g., a cellphone). However, cellular telephone communication capability is not necessary as the various embodiments may be implemented on a computing device which implements a variety of text data entry methods.

Figure 9:
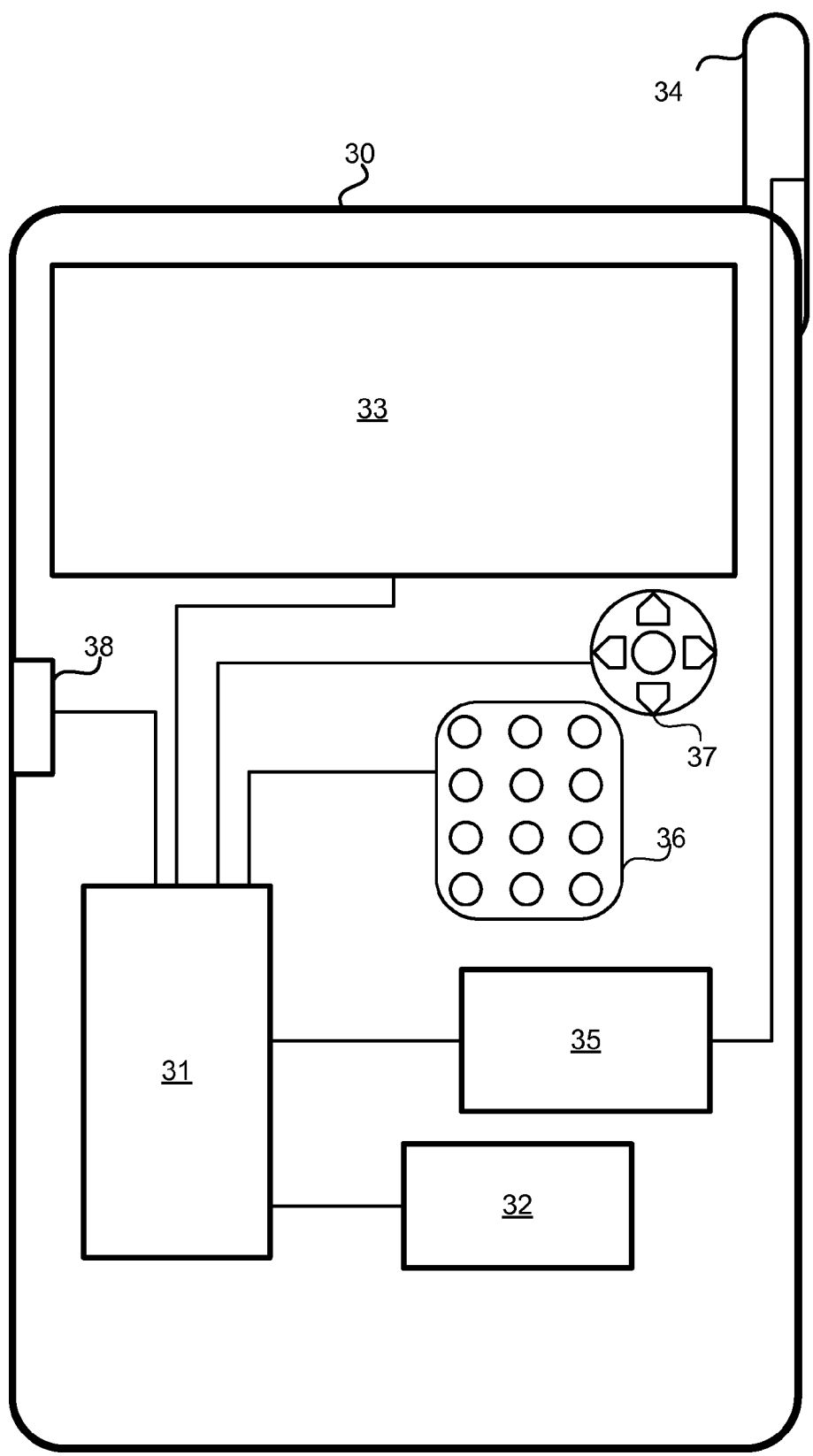
FIG. 9 is a circuit block diagram of an example mobile device suitable for use with the various embodiments.

As used herein the terms "computer" and "computing device" are intended to encompass any form of programmable computer as may exist or will be developed in the future, including, for example, personal computers, laptop computers, mobile devices (e.g., cellular telephones, personal data assistants (PDA), palm top computers, and multi-function mobile devices), main frame computers, servers, and integrated computing systems. A computer typically includes a software programmable processor coupled to a memory circuit, but may further include the components described below with reference to FIGS. 9 and 10.

As used herein, the term "server" refers to any of a variety of commercially available computer systems configured to operate in a client-server architecture with access to a network. In particular, the term "server" refers to network servers, particularly Internet accessible servers, which typically include a processor, memory (e.g., hard disk memory), and network interface circuitry configured to connect the server processor to the network, such as the Internet. The server may also include specialized hardware for security purposes.

As used herein, the term "client" refers to a computing device, such as a mobile device or personal computer, with a processor capable of executing a computer program and a means for communicating with a server such as an Internet connection or a computer program, or refer to a computer program, such as a web browser or an operating system, that includes a link for communicating with computer programs executing on other operating systems, such as an Internet connection. The terms "client" and "server" are descriptive in nature, and are not intended to limit the scope of the invention or the claims.

Many computing environments protect computing devices and networks by executing only validated software. For example, mobile devices, such as cellular telephones, which operate the Binary Runtime Environment for Wireless (BREW®) system verify each application code before it is executed. This protects mobile devices and the cellular data networks to which they connect from being attacked or exploited by malicious software. To support this environment, a certification authority tests each software application prior to distribution to confirm it is free from malware and exploitable vulnerabilities. If an application is determined to be safe, it is signed by the certification authority and identified as a verified software package. Mobile devices can then download and verify the certified software prior to executing the code. As described above and illustrated in FIG. 1, previous mobile devices verified certified software by: unpacking the application to obtain the code and signature file, step 2; performing a hash algorithm over the unpacked code, step 4; decrypting the signature file to obtain a hash value, step 6; confirming that the signature was signed with a valid certificate, step 8, comparing the calculated hash value to the hash value provided with these signature, step 10; and treating the software as trusted if the two hash values are equal, test 12.

While this system for certifying software provides a high level of security, it nevertheless is potentially vulnerable to becoming obsolete and subject to attack over time. The security method illustrated in FIG. 1 is static and the hash algorithms and the signature associated with the software application remain the same throughout the life of the mobile device and the software. Over time cryptographic security methods may "wear out" as vulnerabilities in the methods become known. Certificates used to sign software may be compromised, and hash functions used in the signing and verification process may be attacked. Thus, the inflexible nature of conventional code and data signing methods leave them potentially vulnerable to attack over time.

Heretofore, when a weakness was discovered in a cryptographic component or hash function, the application software would need to be updated in order to change the verification algorithm and associated signature. However, downloading new application files is time-consuming and consumes a large amount of bandwidth.

The various embodiments provide systems and methods to overcome the vulnerabilities in code and data signing mechanisms by enabling a signing server to update and control the verification process implemented in client devices after software is distributed and after client devices leave the manufacturer. In overview, the signing server can be accessed by a client computer via wired or wireless networks, and with a connection established, the signing server can request information and/or dictate to the client computer a series of actions to verify particular software. The client computer performs the requested actions and sends the results to the server without making an attempt to interpret the information. Based on the received information, the server can determine if it trusts the software. If it does, the signing server can tell the client computer to accept the code/data software, and can optionally generate a new signature for the code/data using constructs (i.e., verification algorithm) that it trusts and trusts the client computer to implement. Finally, the client computer can use the new signature and new verification algorithm for subsequent verifications of the software. Alternatively, the server can tell the client computer to simply refuse the software. This may happen if a client computer vulnerability is so bad that the server cannot even trust the client computer information or cannot trust the client computer to implement the required actions in a secure fashion.

Figure 2:
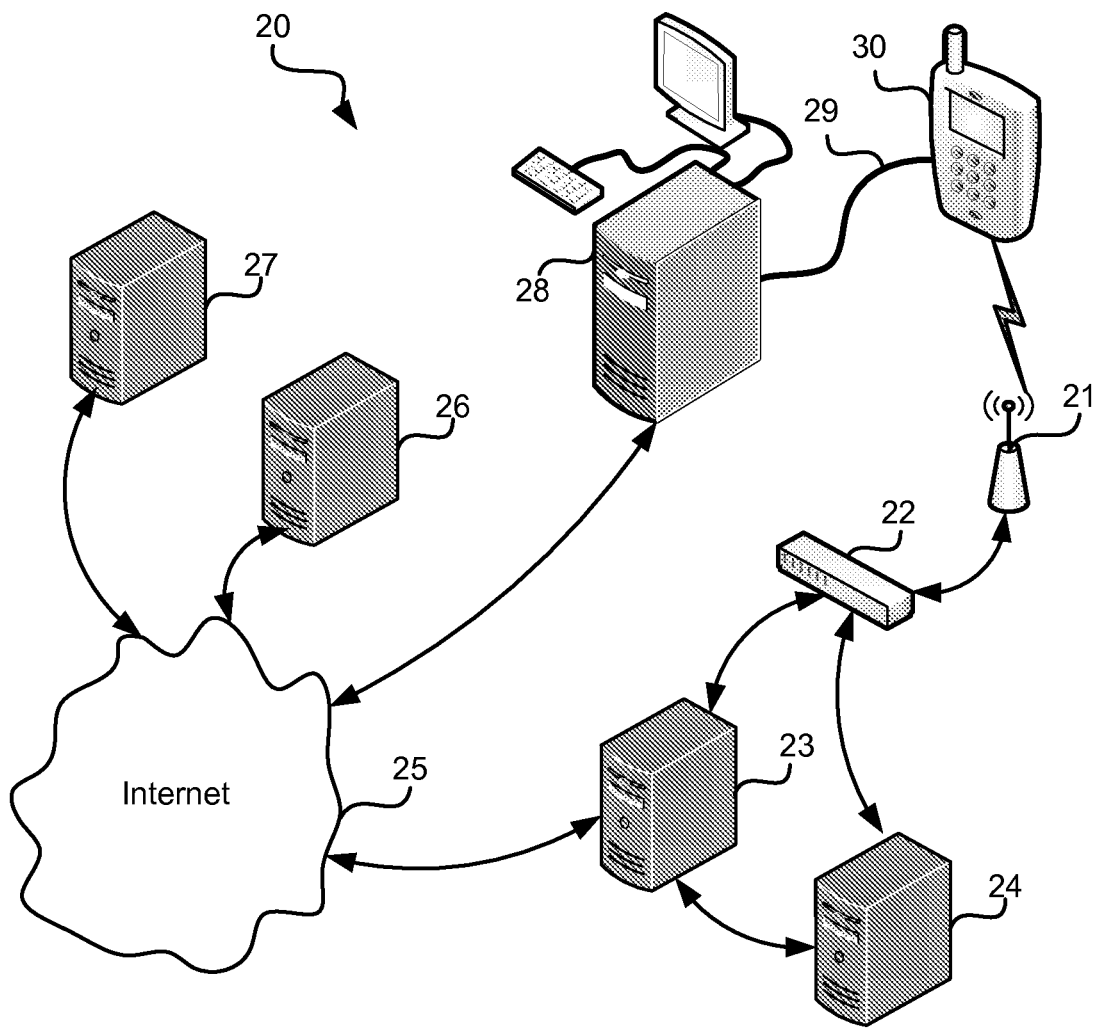
FIG. 2 is a system block diagram of wired and wireless cellular network.

The various embodiments may be implemented in a communication network 20 including both wired and wireless data networks, such as illustrated in FIG. 2. The communication network 20 may include the Internet 25 and a cellular network that enable client devices such as a mobile handset 30 and a personal computer 28 to access a signing server 26 to verify code and/or data and receive updated signatures and verification methods for verifying the code and/or data.

In this example network 20, a base station 21 is a part of a cellular network that includes elements required to operate the network, such as a mobile switching center (MSC) 22. In operation, the MSC 22 is capable of routing calls and messages to and from the mobile handset 30 via the base station 21 when the mobile handset 30 is making and receiving calls. The MSC 22 also provides a connection to telephone landline trunks (not shown) when the mobile handset 30 is involved in a call.

Further, the MSC may be coupled to a server gateway 23 coupled to the Internet 25. Through the server gateway 23 the mobile handset 30 may communicate via the Internet with a signing server 26 as well as content servers 27 from which software applications may be downloaded. Also, personal computers 28 may communicate with the signing server 26 and content servers 27 via the Internet using conventional Internet access methods, such as provided by an Internet Service Provider. Such communications may be sent using file transfer protocol (FTP), hypertext transfer protocol (HTTP), and hypertext transfer protocol over secure socket layers (HTTPS). The communications may consist of various types of files, including hypertext markup language (HTML), image files, and client-side scripts in languages such as JavaScript. Additionally, such messages may include files related to various security schemes, such as digital certificates and signing keys. Additionally, this example network 20 includes a certificate authority (CA) server 24 which is a server that is configured to act as a certificate authority, including the ability to issue digital certificates and public and private keys to web servers such as the signing server 26 and content server 27 in this exemplary network. Further, the CA server 24 may communicate with mobile handsets 30 via the cellular network to keep their set of root certificates current.

A mobile device 30 may communicate with the signing server 26 via the wireless data network access to the base station 21 which couples to the Internet 25 via a gateway server 23. Additionally, a mobile device 30 may communicate with Internet servers by being connected to a personal computer 28 via a data cable 29 or local area wireless network (e.g., via a Bluetooth® transceiver), with the personal computer 28 accessing the Internet via a variety of Internet connections (e.g., telephone modem, cable modem, WiFi, fiber optic connection, etc.). By connecting a mobile device 30 to a personal computer 28, application software and data may be uploaded to the mobile device 30 from content servers 27. Additionally, the mobile device 30 can communicate with the signing server 26 via a wired Internet connection by communicating via the cable 29 with the personal computer 28 which is connected to the Internet 25. In this manner, large amounts of software data and code can be exchanged between the mobile device 30 and the signing server 26 using wired data links which may have higher data transfer rates than the wireless communication networks.

Figure 3:
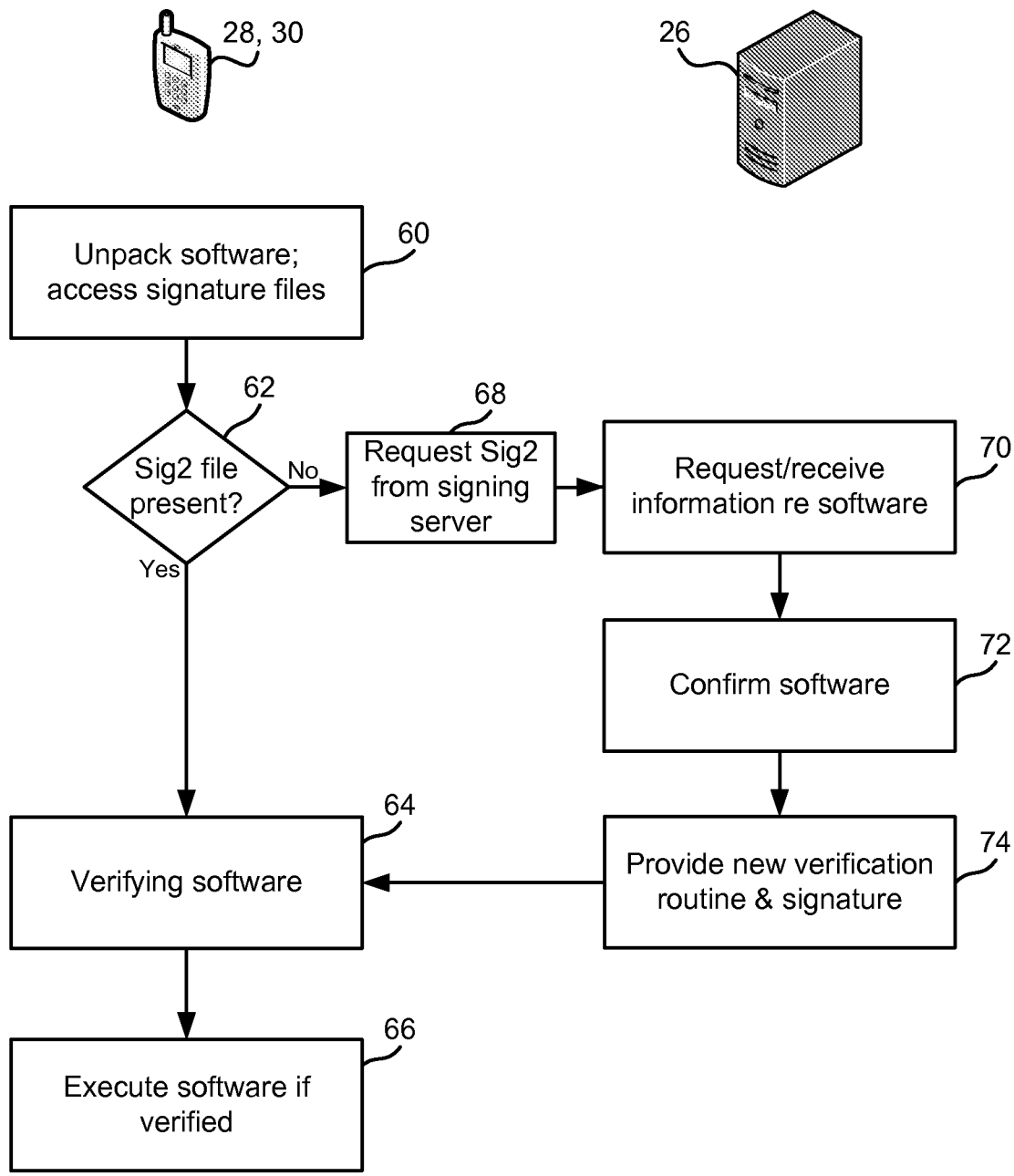
FIG. 3 is process flow diagram illustrating an overview of an embodiment method.
Figure 4:
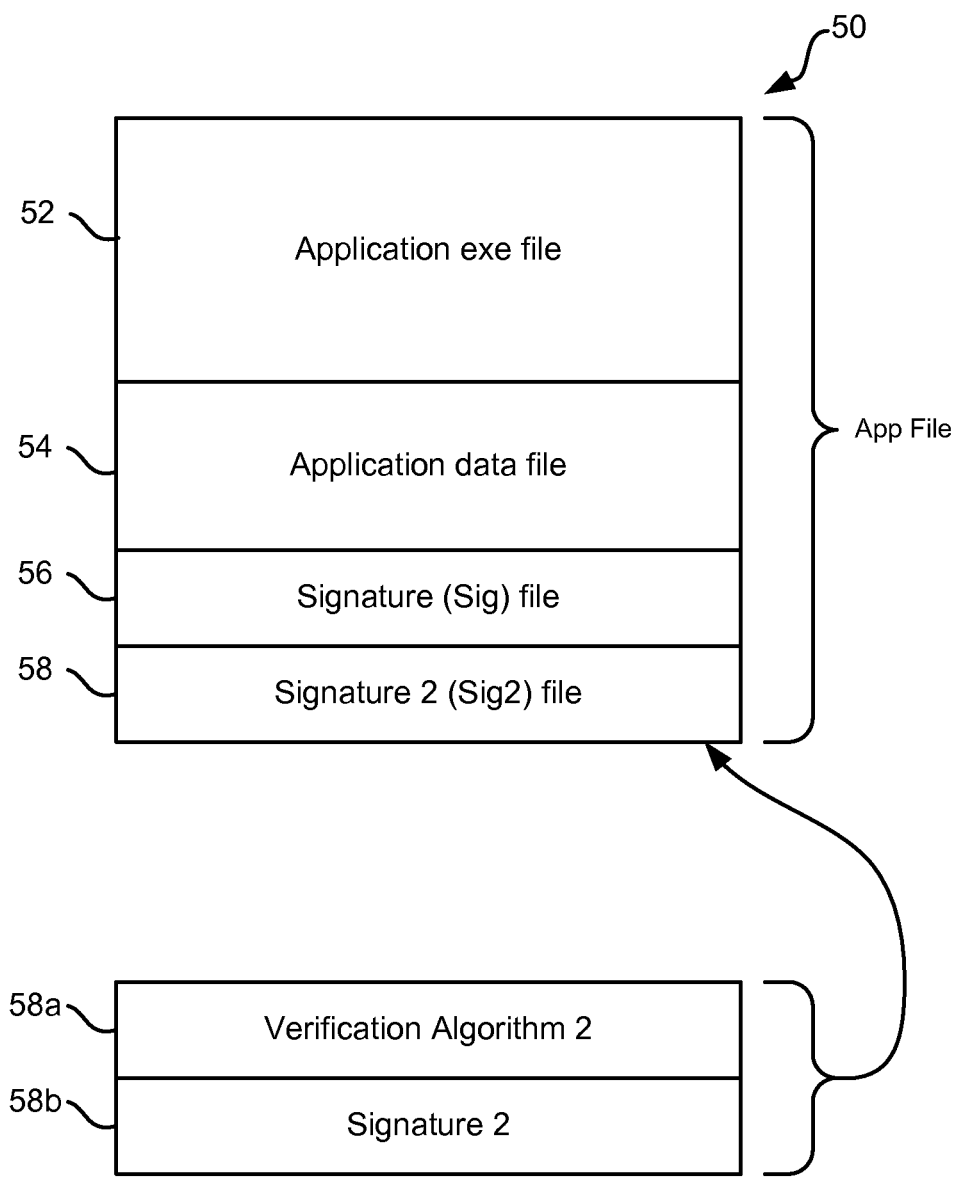
FIG. 4 is an illustration of an application data file according to an embodiment.

An overview of the various embodiments is illustrated in the process flow diagram shown in FIG. 3 and the example application data file shown in FIG. 4. In various embodiments the method used by a computing device to verify signed software is modified to include a second signature file which is generated by a signing server 26. As in the conventional method for verifying software, the computing device 28, 30 unpacks the code are dated to be verified and accesses the signature files, step 60. As illustrated in FIG. 4, an application file 50 may include an executable code file 52, associated data required to run the application 54, a signature file 56, and a signature 2("sig 2") file 58. Conventional signed applications include the executable file 52, a data file 54, and a single signature file 56. The added signature 2 file 58 may include a new or modified verification algorithm 58a and a new signature 58b. The new or modified verification algorithm 58a may be in the form of executable commands, such as XML commands, or may be empty as discussed in more detail below. The new signature 58b is a signature generated by the signing server 26 by applying the new or modified verification algorithm 58a to the application code file 52 and/or the application data 54. The application code file 52 and application data file 54 are generally referred to as the software herein.

Upon unpacking the software and accessing the signature files, step 60, the computing device 28, 30 determines whether the signature 2 file 58 is present, test 62. If the signature 2 file 58 is present in the application file 50 (i.e., test 62="Yes"), the computing device 28, 30 uses the new or modified verification algorithm 58a to generate a verification value that is compared to a signature 2 value, step 64. The signature 2 value is obtained by decrypting the data stored in the signature 2 portion 58b of the signature 2 file 58 using a public key associated with a valid certificate. If the value generated by applying the new or modified verification algorithm to the application software matches the signature 2 value obtained from the signature 2 file 58, the software is verified and the computing device 28, 30 proceeds to execute the code or use the data, step 66.

On the other hand, if there is no signature 2 file 58 present in the application file 50 (i.e., test 62="No"), the computing device 28, 30 attempts to establish a communication link to a signing server 26 to request a signature 2 file, step 64. The signing server 26 receives the request including identification of the software to be verified and proceeds to request information regarding the software from the requesting device, step 70. In this process, the signing server 26 may ask the requesting device 28, 30 for a variety of samples of the software, as well as ask the requesting computing device 28, 30 to perform any of a variety of operations on the software to be verified. The specific information and processing requested of the computing device 28, 30 by the signing server 26 may be determined based upon known or potential security threats at the time. The signing server 26 receives the requested information and using that received information confirms whether the software has been modified or otherwise can be trusted, step 72. If the software is verified or determined to be trustworthy, the signing server 26 may provide the requesting computing device 28, 30 with a new verification algorithm and new signature (i.e. the signature 2) in the form of a signature 2 file, step 74. The requesting computing device 28, 30 receives the signature 2 file from the signing server 26, stores the file (such as with the application code and data), and then can use that signature 2 file 58 for verifying the software, step 64.

The signature 2 file 58 provided to the computing device 28, 30 by the signing server 26 in step 74 can be used for all subsequent verifications of the associated application code and/or data. Thus, unless another event prompts the computing device 28, 30 to contact the signing server 26, the signature 2 file 58 will be used for all subsequent verifications of the software. This process allows software distributors to sell and distribute their software through normal channels and then update the software verification process and signature at a later time using the signing server 26. In some embodiments, the computing device 28, 30 may contact the signing server 26 again at a later time to determine whether there are any updates required to the signature 2 file, thereby permitting periodic security updates to be implemented.

Optionally, if the computing device 28, 30 determines that no signature file is present (i.e., test 62="No") but is unable to establish contact with the signature server 26, the computing device 28, 30 can proceed to verify the software, step 64, using the primary signature file 56 provided originally with the application file 50. Thus, if a signing server 26 is not available or network access cannot be achieved, the application software may nevertheless be verified to the same extent that it could be in the prior art. While such verification may be vulnerable to security compromises, it nevertheless provides some measure of security until such time as the computing device 28, 30 can establish contact with the signing server 26 to obtain the signature 2 file 58.

As illustrated in FIG. 3, the various embodiments provide a cooperative verification environment or system in which the computing device 28, 30 and the signing server 26 each perform a portion of the verification process. In overview, the computing device 28, 30 provides sufficient information to the signing server 26 to enable the server to confirm that the software is trustworthy, and the signing server 26 provides updated verification routines and signatures to enable the computing device 28, 32 to subsequently verify the code and data without having to contact the signing server 26 each time that the application is to be executed.

Figure 5:
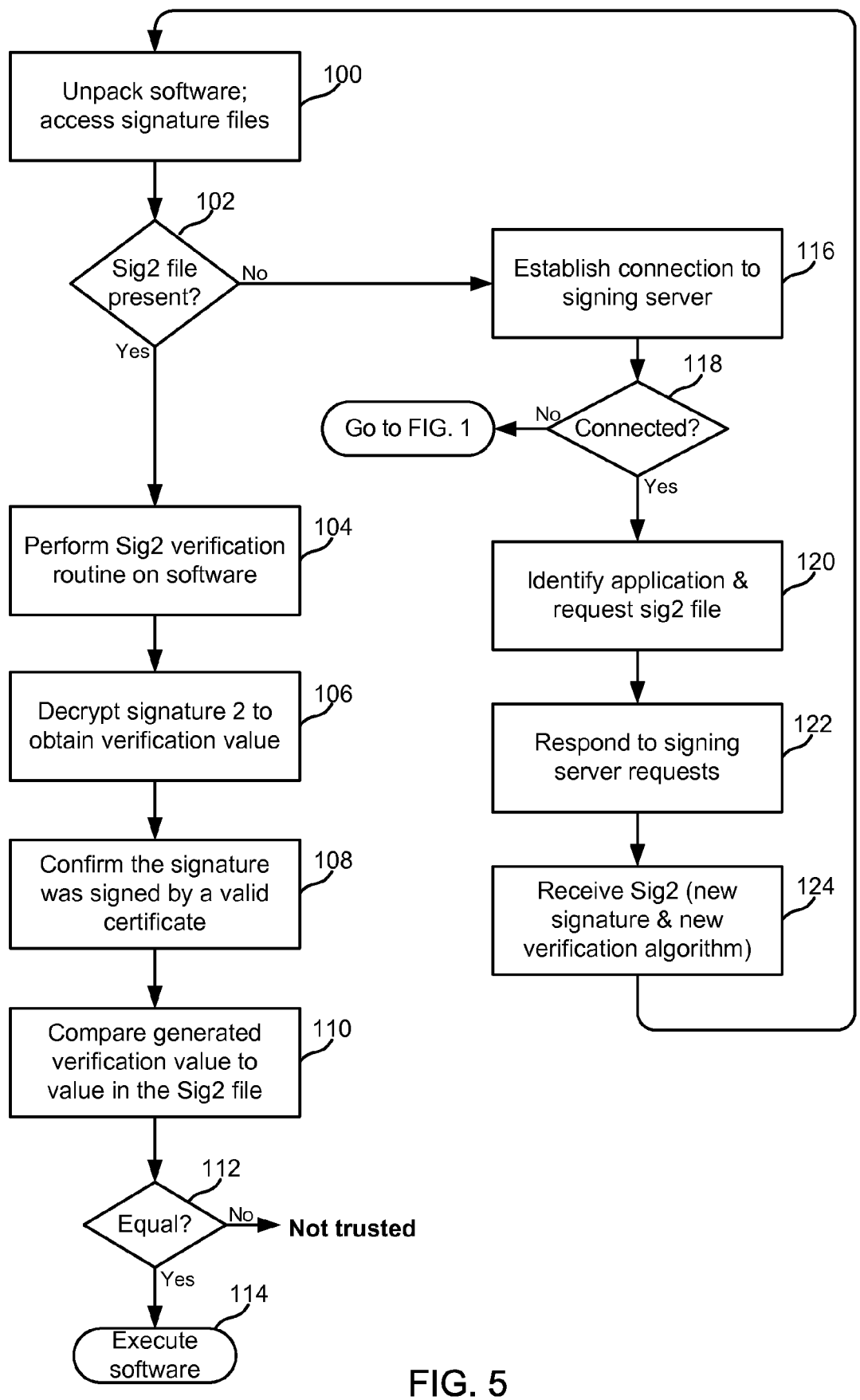
FIG. 5 is a process flow diagram of an embodiment method for verifying software in a computing device.

An embodiment of method steps that may be performed in the computing device 28, 30 is illustrated in FIG. 5. In this embodiment, the presence of the signature 2 file 58 is tested as a predicate step in the processing of the software. In this embodiment, the computing device 28, 30 processor unpacks the application software to access the associated signature files, step 100. In some implementations, the process of unpacking the software to obtain the signature files, step 100, may access another portion of memory where signature 2 file s are maintained (i.e., signature 2 file s need not be stored within or contiguous to the application file 50 as illustrated in FIG. 4). The signature files associated with the application are examined to determine whether a signature 2 file is present, test 102. The signature 2 file will normally be present after the computing device 28, 30 has already contacted the signing server 26 for the particular application. If the signature 2 file is present the processor performs the verification routine within the signature 2 file on the unpacked software, step 104. As described below, the verification routine in the signature 2 file may be a standard hash function, a modified standard hash function, or a completely different and unique verification algorithm as required to defeat threats arising against the particular application. The processor also decrypts the digital signature within the signature 2 file to obtain a verification value, step 106. This decryption may be performed using a public key corresponding to a digital certificate issued to the signing server 26. In the process of decrypting the signature 2 file, the processor may also confirm that the signature was signed by a holder of a valid certificate, step 108. This verification confirms that the signature 2 file was received by a trusted signing authority. The generated verification value is then compared to the verification value obtained by decrypting the signature 2 file, step 110. If the two values are equal (i.e., test 112="Yes"), the processor is informed that the software can be trusted and execution will proceed accordingly, step 114. However, if the two values are not equal (i.e., test 112="No"), the processor is inform that the software cannot be trusted and in most cases the application code will be blocked from executing or the data deleted from memory.

If a review of the unpacked software reveals that there is no signature 2 file present in or corresponding to the application file 50 (i.e., test 102="No"), the processor of the computing device 28, 30 may establish a connection to the signing server 26, step 116. If a connection to the signing server 26 is not achieve (i.e., test 118="No"), such as when a network is not available to the computing device 28, 30 or the signing server 26 does not respond to a request for a connection, the computing device processor may verify the software using the conventional verification method described above with reference to FIG. 1.

If a connection is established to the signing server 26 (i.e., test 118="Yes"), the processor may request a signature 2 file and identify the particular application software for which the verification information is required, step 120. This information should be sufficient to enable the signing server 26 to locate a corresponding data file within the signing server's memory (e.g., within a countermeasures database maintained in the signing server). For example, the computing device 28, 30 may provide the name, identifier and/or serial number for the particular application software. In an embodiment, the software identifying information provided to the signing server 26 may be any one or combination of a unique identifier (e.g., a serial number), a software product identifier (e.g., a software product and version number), the original digital signature provided with the software, some portions or segments of the original digital signature (such as a specific portion or segment requested by the signing server 26), or some portions or segments of the software itself. The step of providing a software identifier (including any of the aforementioned forms of identifier) may be accomplished autonomously by the computing device 28, 30 or may be accomplished in response to receiving a request for a particular software identifier received from the signing server 26 after the connection is established. The computing device 28, 30 may also inform the signing server 26 of its own make or model, such as by providing a model identifier, in order to enable the signing server 26 to better determine the type of verification that should be performed. Once that information has been provided to the signing server 26, the computing device 28, 30 may stand by to receive and respond to requests for information that it may receive from the signing server 26. If the signing server 26 has been configured to confirm the particular software, as may be the case when there is a known threat that weakens or compromises the verification security afforded by the original signature provided with the application software, the signing server 26 will send one or more requests for information regarding the software to the computing device 28, 30, step 122. However, if the signing server 26 is not provided with updated verification routines or signatures for the particular application software, as may be the case when there is no known threat to the software, the signing server 26 may skip the step of requesting information and simply provide a signature 2 file which includes instructions to use the primary signature and verification method or contains the primary signature and instructions to use the standard primary verification hash routine, step 122.

If the computing device 28, 30 receives a request for data from the signing server 26 its processor performs the requested steps and returns the requested data via the established network connection, step 122. It is envisioned that the signing server 26 may be configured to request a broad range of data and processing steps of the computing device 28, 30 as necessary to verify the particular software. For example, the signing server 26 may request samples of the software taken at particular positions within the file (e.g., first 50 bytes, last 50 bytes and 50 bytes from a portion in the middle of the file). Alternatively, the signing server 26 may request the computing device 28, 30 to perform an operation on the software, such as performing a particular hash function and providing the resulting value to the signing server 26. It is envisioned that the particular information requested of the computing device 28, 30 will be configured to provide information that the signing server 26 can use to determine with high confidence that the particular software is trustworthy or safe to execute. Thus, the particular information requested by the signing server 26 may vary from request to request so that a party trying to defeat the signing server would be unable to anticipate exactly what data may be requested or which operations may be performed by the computing device 28, 30. Additionally, the use of the requested data by the signing server 26 can be maintained in confidence so that the verification process utilized by the signing server cannot be anticipated or otherwise compromised. Thus, the signing server 26 may request more data than it uses to confirm the software so as to further mask the method by which software is verified.

By way of an example, the signing server 26 might instruct the computing device 28, 30 to perform the following series of steps: (a) prepend value X to the software contents; (b) apply hash algorithm Y to the so modified software contents; (c) apply hash algorithm Z to the so modified software contents; (d) create a compound to hash from the results of the hash Y and hash Z processes; (e) report the compound hash value; (f) report the values at file offsets A, B and C; (g) report the run-time privileges that the software is requesting; (h) report to the terms of the license that the software is asking for; (i) report the notifications or MIME types the software is registered for; and (j) report the version of cryptographic library that the client computer is using. In response to such a request, the computing device 28, 30 performs the requested processes and returns the requested data to the signing server 26 in step 122. The signing server 26 can then use some or all of this (or other) information and processing results to determine whether the software has been modified, contains malware or otherwise is untrustworthy. The signing server 26 may also use the information to determine whether the computing device 28, 30 is capable of or can be trusted to perform certain verification processes.

The process of the signing server 26 requesting information and the client computing device 28, 30 complying with the requests, step 122, may be accomplished autonomously or semi-autonomously. In an embodiment, the client computing device 28, 30 automatically responds to requests for information from the signing server 26 without involvement of the user. In such an embodiment, the process of exchanging information between the computing device 28, 30 and the signing server 26 is invisible to the user who may only notice an extra delay the first time that an application is launched. In another embodiment, the process of exchanging information between the computing device 28, 30 and the signing server 26 may include some user interaction. For example, the signing server 26 may request that users input information regarding the product, such as a license number or serial number that may be provided on the packaging or at the time of download. As another example, the signing server 26 may request users to identify themselves and enter their address, mobile device telephone number and e-mail address. This additional information regarding users may enable the signing server 26 to register users and track the deployment of signature 2 file s. Having a record of user e-mail addresses and/or mobile device telephone numbers may also enable the signing server 26 to send out notices to computing devices 28, 31 that a new signature 2 file update should be obtained, as may be necessary when a significant security threat is identified. In a semi-autonomous embodiment, the signing server 26 may also pose questions to users regarding the source of the software to be verified where such information would enable the signing server 26 to determine whether the software is trustworthy. In an implementation in which the signing server 26 gathers user registration information as part of this process, the signing server 26 may request the information from the computing device 28, 30 even when there is no known threat or weakness in the primary signature and verification method. In either embodiment, the sending server 26 may provide the instructions necessary (e.g., XML code) to cause the computing device 28, 30 to obtain the requested data or generate a display prompting users to input the requested data.

Using the information provided by the computing device 28, 30, the signing server 26 can prepare and send a new signature 2 file 58 to the computing device 28, 30 which receives it in step 124. In cases where the software is not facing a known threat or the primary signature and verification method which were provided with the software when distributed are adequate, the signature 2 file 58 provided to the computing device 28, 32 may be nothing more than a command to use the primary signature and verification method. In situations where there has been a minor attack on the software or hash function used in the primary verification method, the signature 2 file 58 may include a simple modification to the primary verification method, such as appending or prepending a random value to the software to be verified prior to running the hash function, along with a new signature. In situations where there has been a major attack on the software or hash function, the signature 2 file 58 may include an instruction to use a different hash function or an entirely new verification method along with a new signature. In some situations, a completely new hash function may need to be downloaded. In situations where there is sufficient bandwidth to permit an over-the-wire or over-the-air download of the new hash function, that process may be implemented immediately. In situations where there is insufficient bandwidth to permit an over-the-air download of the new hash function, the signing server 26 may provide instructions to the computing device 28, 30 to enable it to download the new hash function at a later time when it is connected to a network with sufficient bandwidth to complete the download. It is envisioned that the signing server 26 will be configured with instructions for providing signature 2 file s 58 which are tailored to the known threat as such threats develop. By providing a flexible process that enables the signing server 26 to transmit a verification method and signature to computing devices 28, 30 well after the devices and application software have been deployed, the various embodiments enable security measures to be responsive to threat developments.

As the signing server 26 transmits the new signature 2 file 58 and the file contents are received by the computing device 28, 30, the signature 2 file 58 is stored in memory, step 124. In an embodiment, the new signature 2 file 58 is stored in conjunction with the corresponding application file 50 as illustrated in FIG. 4. In an alternative embodiment, the new signature 2 file 58 is stored in a separate portion of memory reserved for holding signature 2 file s. With the signature 2 file 58 received and stored in memory, the processor of the computing device 28, 30 can proceed to verify the application file by performing the steps 100-112 as described above.

Figure 6:
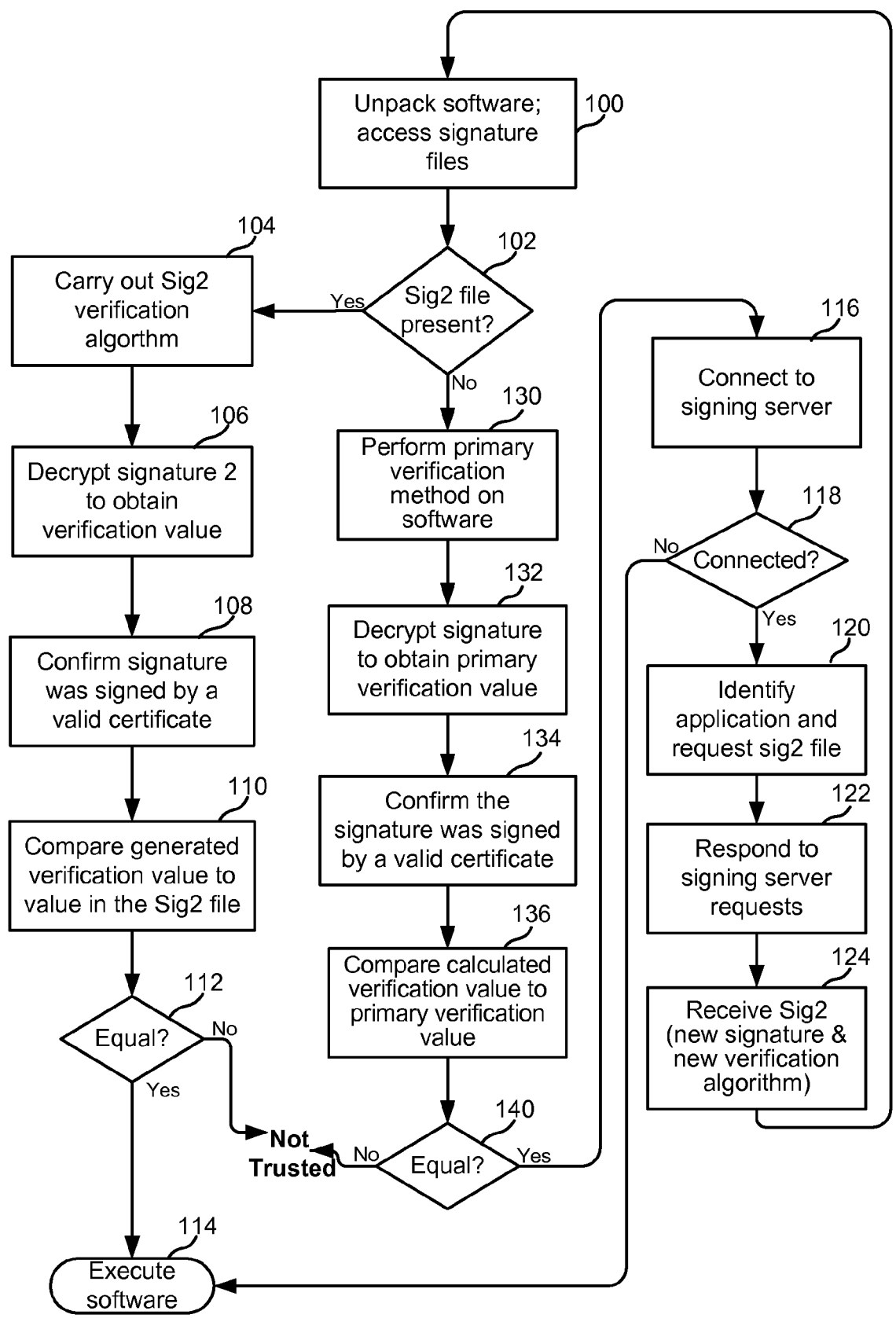
FIG. 6 is a process flow diagram of another embodiment method for verifying software in a computing device.

An alternative embodiment of the processing that may be performed in the computing device 28, 30 is illustrated in FIG. 6. In this embodiment, when there is no signature 2 file 58 present, the processor performs the primary verification method to confirm that the software was trusted at the time it was produced before the processor makes contact with the signing server 26.

Referring to FIG. 6, this embodiment includes many of the same steps as described above with reference to FIG. 5. When an application is selected for execution, its software is unpacked in order to access the signature file step 100. If the signature 2 file 58 is present, test 102, the corresponding verification method is implemented and the software executed if properly verified, steps 104-114, as described above with reference to FIG. 5. However, if the signature 2 file is not present (i.e., test 102="No"), the computing device 28, 30 processor proceeds to perform the primary verification procedure provided with the software at the time of its distribution. As discussed above, this may involve performing the primary verification method, such as a particular hash function, on the unpacked software, step 130. The signature file 56 is decrypted in order to obtain the primary verification value contained within the signature, such as a hash value, step 132. The signature is evaluated to determine that it was signed by a valid certificate, step 134. The calculated verification value is compared to the primary verification value contained within the signature, step 136. If the two verification values are not equal, test 140, then the software is not trusted and no further processing on the software may take place.

On the other hand, if the two verification values are equal (i.e., test 140="Yes"), this indicates that at least at one time the software was trustworthy and so the processor of the computing device 18, 30 attempts to establish a connection to the signing server 26, step 116. As discussed above, this connection may be by any wired or wireless network with access to the network on which the signing server 26 resides, such as the Internet. If a connection to the signing server 26 is not possible (i.e., test 118="No"), then the software may be executed, step 114, because it has been verified through the primary verification method. If a connection to the signing server is established (i.e., test 118="Yes"), then the computing device 18, 30 processor identifies the application (such as by providing a software identifier) and requests a signature 2 file, step 120, and proceeds to respond to signing server requests for information, step 122, and receive and store any resulting signature 2 file, step 124, as described more fully above with reference to FIG. 5.

Figure 7:
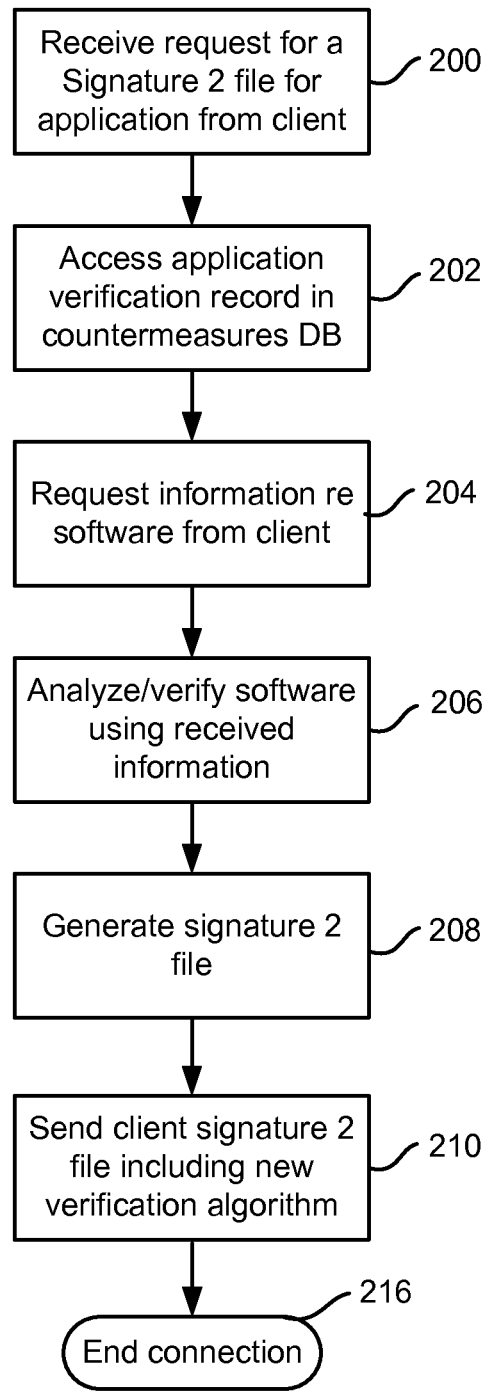
FIG. 7 is a process flow diagram of an embodiment method for verifying software in a signing server and updating verification methods and signatures on client devices.

An example embodiment of processing steps that may be accomplished in the signing server 26 is illustrated in FIG. 7. The signing server 26 may accept a connection with a client computing device 28, 30 and receive a request for a signature 2 file for a particular application, step 200. As part of this request, the signing server 26 may be informed of the application name, identifier or serial number, as well as the make and model of the requesting computing device 28, 30. Using this information, the signing server 26 can access a data file containing interrogation steps, verification methods and a corresponding signature appropriate for verifying the particular application code and/or data operating within the identified computing device 28, 30, step 202. It is anticipated that as threats to verification methods, certificates and individual applications evolve, a countermeasures database maintained within the signing server 26 will be updated with data records holding appropriate interrogation steps, verification methods and signature values to defeat the known threats to particular applications. In this manner, whenever a computing device requests an update to its signature 2 file for a particular application, the signing server 26 is able to verify the software using the most up-to-date methods for detecting and defeating known threats.

Using the interrogation methods stored in the corresponding data file retrieved from server memory, the signing server 26 begins a dialogue with the client computing device 28, 30 via the open communication link, step 204. As mentioned above, if there is no known threat or weakness in the particular application or its primary verification method, there may be no need to perform interrogation of the computing device 28, 30, in which case step 204 may be bypassed. Even if there is no known threat or weakness, the signing server 26 may nevertheless request information from the client computing device 28, 30 sufficient to record that the request has been made. A request for user identification and contact information may be made in order to register the application software as well as obtain information that the signing server 26 may later use to contact users if a significant threat emerges. Thus, the processes of the various embodiments may be combined with license and/or warrantee registration processes.

As discussed above, the types of information that may be requested from the client computing device 28, 30 are basically unlimited in order to provide the greatest flexibility possible for identifying and defeating whatever future security threats that may emerge. For example, the signing server in step 204 may request samples of the software, or request the client computing device 28, 32 to perform one or more functions, such as one or more hash functions, on the software and provide the results to the signing server 26. As another example, the signing server may 26 also request information regarding the resources to which the code will require access, which can provide information regarding the potential risk posed by the particular application. As another example, the signing server 26 may request transmission of the signature provided with the software to enable the signing server to verify the certificate for itself as well as compare the signature to any signature it has within its data records. As a further example, the signing server 26 may request some or all of these various types of information in order to better detect malware or unauthorized modifications to the software.

Using the information received from the client computing device 28, 30, the signing server 26 can perform analyses and comparisons to information stored in server memory in order to determine whether the software is trustworthy, contains any known threats or malware, or is vulnerable to any known weaknesses, step 206. The nature of the analyses and comparisons performed in this step 206 will depend upon the nature of any threat or vulnerability associated with the particular application. Depending upon the determination made regarding the particular application software, the signing server 26 may then recall from memory or otherwise generate a signature 2 file, step 208. If the analysis of the software by the signing server 26 in step 206 reveals that the software is untrustworthy or contain malware, the corresponding signature 2 file generated in step 208 may be an instruction to terminate the application and not execute or access the software. If the analysis of the software by the signing server 26 in step 206 reveals that the software is trustworthy but there is a known vulnerability or threat, the signing server can access from memory or generate a signature 2 file that includes a new verification method and corresponding new signature in step 208. If the analysis of the software by the signing server 26 in step 206 reveals that the software is trustworthy and there is no known threat of vulnerability, the generated signature 2 file may simply be an instruction to implement the primary verification method using the primary verification signature. The signature 2 file may be recalled from a countermeasures database maintained in the signing server 26 or may be generated by the signing server at the time. Once the signature 2 file is generated in step 208, the file is transmitted to the client computing device 28, 30, step 210. Finally, with the process complete the signing server may end the connection with the computing device, step 216.

The nature of the analyses and comparisons performed in the signing server 26 to verify application code and/or data may be kept confidential. Thus even though requests to computing devices 28, 30 can be tracked, the actual steps taken in analyzing the received data may be kept secret to protect the process from being compromised.

Figure 8:
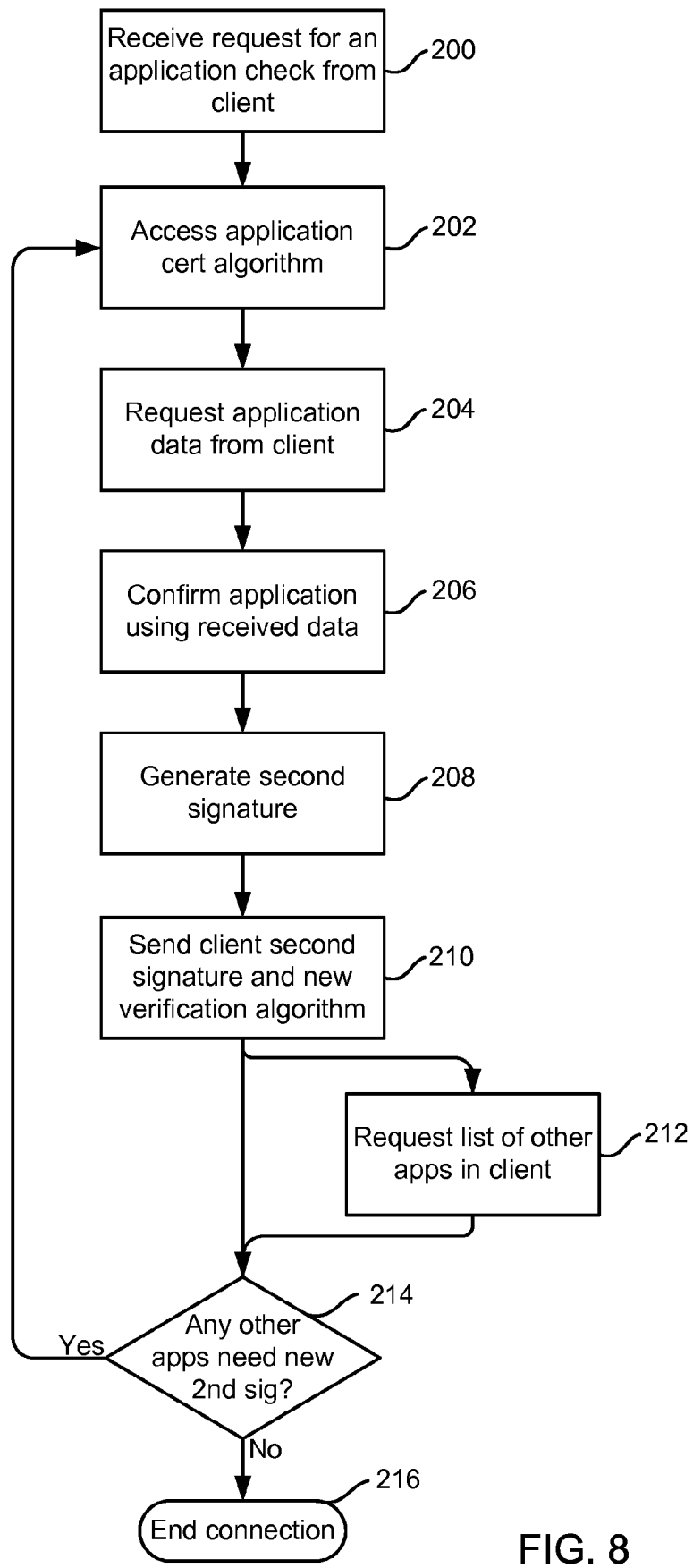
FIG. 8 is a process flow diagram of another embodiment method for verifying software in a signing server and updating verification methods and signatures on client devices.

An alternative embodiment for implementation on the signing server 26 is illustrated in FIG. 8. In this embodiment, the signing server 26 takes advantage of the open connection with the client computing device 28, 30 to inquire whether other application software is present on the device. This embodiment enables the signing server 26 to update the verification methods and signatures for other applications that are vulnerable to a threat which has emerged since a signature 2 file was provided to the computing device 28, 30. This capability enables the signing server 26 to implement security improvements for applications on a regular basis since users can be expected to periodically purchase new applications which when activated will trigger the computing device to contact the signing server 26.

Referring to FIG. 8, this embodiment proceeds through steps 200-210 as described above with reference to FIG. 7. Once the signature 2 file has been transmitted to the client computing device 28, 30 in step 210, the signing server 26 may request a list of other application code and/or data that is stored on the client device, step 212. The computing device 28, 30 may be configured to maintain a list of software that can or should be verified, in which case this listing is provided to the signing server 26. In another implementation, the client computing device 28, 30 may simply provide a list of all software applications stored in memory to enable the signing server 26 to determine which of those require verification updates.

Using the list of other applications received from the client computing device 28, 30, the signing server 26 determines whether any of those applications require a new signature 2 file, test 214. This may be accomplished by comparing each item in the received list to a database of vulnerable applications in a vulnerability or countermeasures database maintained in the signing server 26. If the signing server 26 determines that there are no other applications requiring a new signature 2 file (i.e., test 214="No"), the signing server 26 may simply terminate the connection with the computing device 20, 30, step 216, thereby ending the verification update session. However, if the signing server 26 determines that at least one application present on the client computing device 28, 30 requires an updated signature 2 file (i.e., test 214="Yes"), the signing server 26 may select one of the applications and access the corresponding data record within the countermeasures database, returning to step 202. Using the information retrieved from the countermeasure database for the selected application, the signing server 26 proceeds with the verification and signature 2 file update process of steps 204-210 as described above with reference to FIG. 7. Since the signing server 26 has already obtained a list of applications from the client computing device 28, 30 the step of requesting such a list, step 212, need not be repeated and the signing server 26 can return to determining whether there is another application which requires a signature 2 file update, test 214. The signing server 26 can repeat this loop until there are no more applications on the client mobile device requiring a signature 2 file update, at which point the signing server may end the connection with the client device, step 216, thereby terminating the application evaluation and security update session.

As new threats emerge to existing software code and data, a variety of countermeasures may be implemented depending upon the severity of the threat. If the nature of the threat is unlikely to cause problems with application software deployed in computing devices with valid signature 2 file s, there may be no need to further update those applications. For example, if a threat has been detected to a particular game application, that threat may not extend to versions of the game that are already deployed on computing devices since there may be no mechanism by which the threat can reach into the computing device and the currently deployed signature 2 file is sufficient to provide protection. In such cases, the signature 2 file may be deployed only as new applications are activated on computing devices such as described above with reference to FIGS. 5 or 6.

If the nature of the threat is likely to cause problems with applications that have been deployed but is not of such a magnitude that immediate action is required to protect all computing devices, the signing server 26 may be configured to identify such vulnerable applications and provide updated signature 2 files whenever computing devices contact them for other applications such as described above with reference to FIG. 8.

If the nature of the threat is likely to cause immediate problems such that corrective actions need to be taken immediately for all computing devices, electronic messages, such as e-mail or SMS messages, may be broadcast to all computing devices having the vulnerable application directing them to contact the signing server 26 at least before executing the particular application again. As described above, the signing server 26 may obtain user information sufficient to be able to broadcast such messages as part of the process of providing an initial signature 2 file . A variety of methods for sending electronic messages to computing devices are well known in the art, any of which may be implemented for providing such warnings. Upon receiving a notice that a particular application is facing a severe threat, computing devices may simply delete the signature 2 file from those applications, which will prompt the devices to contact the signing server 26 the next time that application is selected for execution as described above with reference to FIGS. 5 and 6.

The various embodiments have a number of uses beyond just improving the security environment for code and data and improving code/data verification methods. For one, the embodiments may also be used to validate unsigned software. To do this, the signing server 26 can request and receive from the client computer 28, 30 sufficient information to confirm that the software is safe prior to the client computer executing the code or processing the data. This use may be best illustrated by way of an example. One of the most effective ways to run unsigned/un-vetted code on a closed client is to look beyond attacking the signing system itself, and instead to exploit a flaw in the code that has been legitimately signed, and leverage this flaw (via a buffer overrun for example) to run malicious or unauthorized code. In a typical example, a game console may require that the code for all games be signed. However, it is impossible for the console manufacturer to insist that all data handled by the individual games also be signed. There are a number of reasons for this, the most obvious being that such data is typically not static, and may change frequently (e.g., the high game score data file).

Hackers have been known to take advantage of this, and by creating a specially crafted high scores file, exploit weaknesses in the game to run malicious code on the console. To overcome this vulnerability, in an embodiment information about the (unsigned) high scores file may be uploaded to the signing server 26 for validation before the associated game is launched or copied. Validating unsigned data in this way can remove the risk to the vulnerable application.

Another use of the various embodiments is to identify and characterize software that has been modified in an attempt to circumvent the signing system. For example, if the information sent by the client computer to the signing server does not match the expected information, the server may ask the client computer to upload the entire code file or data set. Once this data is obtained, the server is free to analyze it in the comfort of a secure environment. After confirming the safety or risk posed by the uploaded software the signing server can then provide a new signature and verification procedure (i.e., sig 2 file) to use henceforth as described above.

Another use of the various embodiments enables the signing server to use code and data information obtained from a number of clients in the verification process to track the outbreak and spread of attacks on software and devices. Even if the signature validation circumvention is good enough to fool both the client computer and signing server 26 for some period of time, once the vulnerability has been determined, the signing server 26 may trace though its logs in order to determine the starting point and growth pattern of the exploitation. Further, in embodiments where the signing server 26 requests the client computer 28, 30 to download the entire software file for verification, the signing server may capture the code/data for analysis.

The various embodiments provide several advantages over known systems for securing code and data on computer systems. The embodiment security mechanisms are dynamic and thus can be modified to counteract most newly discovered vulnerabilities in the client computer by simply modifying the signing criteria instead of assuming the worst and rejecting any legacy signatures out of hand. The embodiment security mechanisms do not require that the client computer implementation be updated, thus saving the cost and expensive of modifying the computer and mobile devices themselves. The embodiment security mechanisms work well in an environment where client computers have limited storage and transmission capabilities (such as is the case with most mobile devices) such that transmitting a copy of the entire code/data image is not feasible. The embodiment security mechanisms work for both signed and unsigned code/data. The embodiment security mechanisms provide mechanisms for tracing attempts at circumventing the signing system, as well as capturing the code/data involved in the attempt.

The embodiments described herein may be implemented on any of a variety of mobile devices. Typically, such mobile devices will have in common the components illustrated in FIG. 9. For example, mobile devices 30 may include a processor 31 coupled to internal memory 32 and a display 33. Additionally, mobile devices 30 will have an antenna 34 for sending and receiving electromagnetic radiation that is connected to a wireless data link and/or cellular telephone transceiver 35 coupled to the processor 31. In some implementations, the transceiver 35 and portions of the processor 31 and memory 32 used for cellular telephone communications are collectively referred to as the air interface since it provides a data interface via a wireless data link. Mobile devices 30 also typically include a key pad 36 or miniature keyboard and menu selection buttons or rocker switches 37 for receiving user inputs. Mobile devices 30 may also include connector plugs 38 for connecting data cables to the processor 31, such as a FireWire connector, or external memory devices, such as a USB memory device (not shown).

Figure 10:
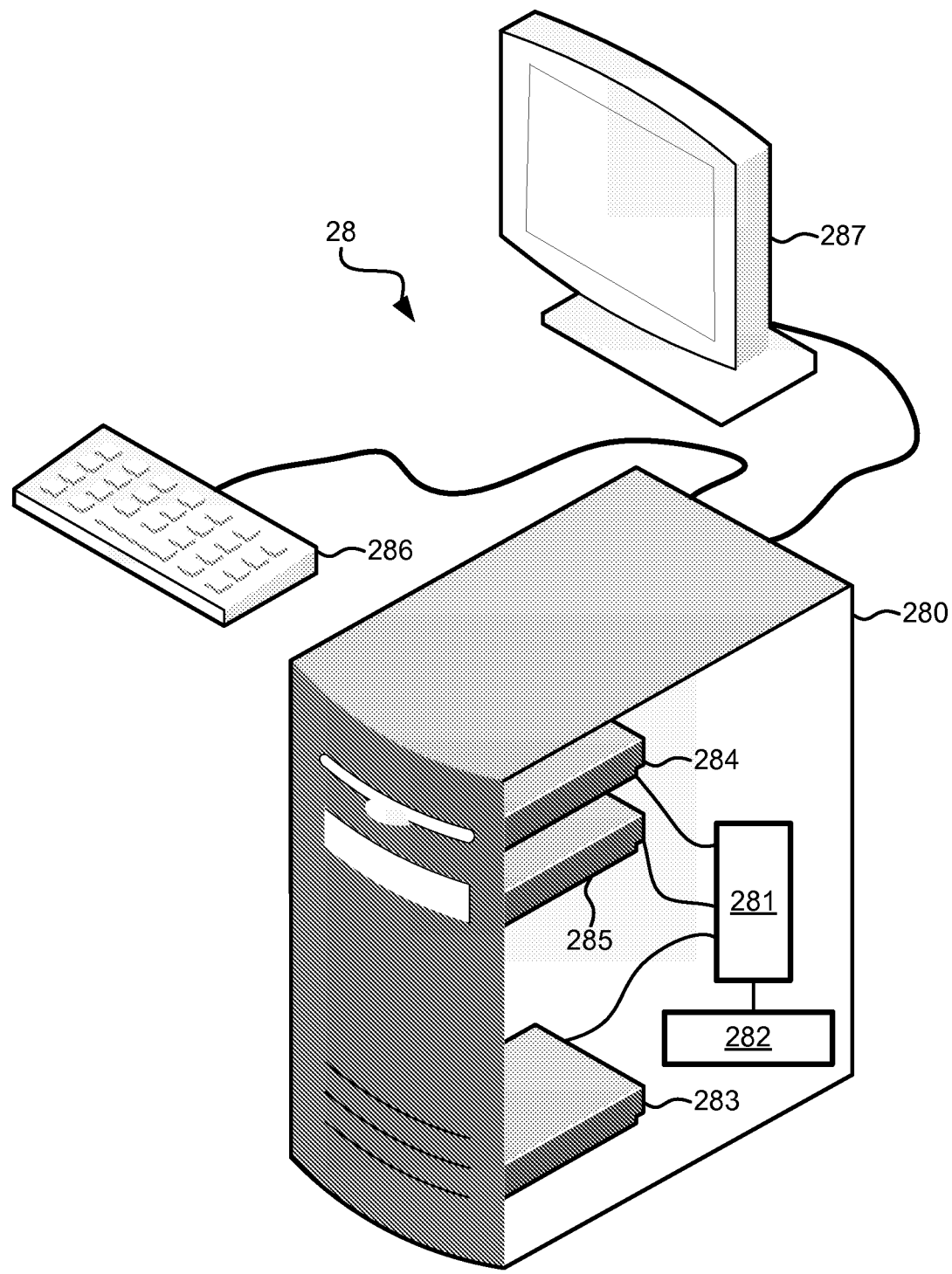
FIG. 10 is a circuit block diagram of an example personal computer suitable for use with the various embodiments.

The embodiments described above may also be implemented on any of a variety of computing devices, such as, for example a personal computer 28 illustrated in FIG. 10. Such a personal computer 28 typically includes computer assembly 280 including a processor 281 coupled to volatile memory 282 and a large capacity nonvolatile memory, such as a disk drive 283. The computer assembly 280 may also include a floppy disc drive 284 and a compact disc (CD) drive 285 coupled to the processor 281. Typically the computer 28 will also include a user input device like a keyboard 286 and a display 287. The computer assembly 280 may also include a number of connector ports for receiving external memory devices coupled to the processor 281, such as a universal serial bus (USB) port (not shown), as well as network connection circuits (not shown) for coupling the processor 281 to a network.

The various embodiments may be implemented by a computing device processor 31, 281 executing software instructions configured to implement one or more of the described methods. Such processors may be microprocessor units, microcomputer units, programmable floating point gate arrays (FPGA), and application specific integrated circuits (ASIC) as would be appreciated by one of skill in the art. Such software instructions may be stored in memory 32, 282, 283 as separate applications, as part of the computer's operating system software, as a series of APIs implemented by the operating system, or as compiled software implementing an embodiment method. Further, the software instructions may be stored on any form of tangible processor-readable memory, including: a random access memory 32, 282, hard disc memory283, a floppy disc (readable in a floppy disc drive 284), a compact disc (readable in a CD drive 285), read only memory (such as an EEPROM), and/or a memory module (not shown) plugged into the computer 30, 280, such as an external memory chip or a USB-connectable external memory (e.g., a "flash drive"). Alternatively, some steps or methods may be performed by circuitry that is specific to a given function.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal or mobile device. In the alternative, the processor and the storage medium may reside as discrete components in a user terminal or mobile device. Additionally, in some aspects, the steps and/or actions of a method or algorithm may reside as one or any combination or set of codes and/or instructions on a machine readable medium and/or computer readable medium, which may be incorporated into a computer program product.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

What is claimed is:

1. A method for executing software after it has been distributed, comprising:
   receiving from a client computer a request for a second verification method and a second signature for software to be verified that has been previously distributed with a first verification method and a first signature from an original signing server, wherein the request for a second verification method and a second signature indicates that the second signature is not present in the software;
   receiving from the client computer an identifier of the software to be verified;
   requesting information enabling verification of the software from the client computer, the information comprising less than an entire code file or data set of the software;
   determining whether the software is trustworthy based upon the information provided by the client computer; and
   sending to the client computer the second verification method and the second signature for the software for use by the client computer in verifying the software, wherein the second verification method and second signature are appended to the first verification method and the first signature, the second verification method is different than the first verification method, and the second verification method comprises an executable command.

2. The method of claim 1, further comprising requesting information from the client computer related to a user of the client computer.

3. The method of claim 1, wherein the received identifier of the software includes a portion of the software.

4. The method of claim 1, wherein the received identifier of the software includes the first digital signature provided with the software.

5. The method of claim 1, wherein the received identifier of the software includes a portion of the first digital signature provided with the software.

6. The method of claim 1, wherein the requested information related to the software includes a portion of the software.

7. The method of claim 1, wherein the requested information related to the software includes results of a hash function performed on the software.

8. The method of claim 1, wherein the requested information related to the software includes identification of client computer resources accessed by the software.

9. The method of claim 1, wherein the second verification method includes a constant appended or prepended to the software before a hash function is applied to the software and the second signature is a signature resulting from applying the second verification method to the software.

10. The method of claim 1, further comprising accessing a data file using the received identifier of the software, the data file including information related to verifying the software, wherein:
    requesting the information from the client computer related to the software includes requesting information identified in the accessed data file;
    determining whether the software is trustworthy includes performing an operation identified in the accessed data file; and
    obtaining the second verification method and second signature are obtained from the accessed data file.

11. The method of claim 10, wherein the accessed data file is accessed from a countermeasures database.

12. A method for executing software after it has been distributed, comprising:
    determining whether a second signature is present in the software;
    requesting from a signing server a second verification method and second signature for software to be verified that has been previously distributed with a first verification method and a first signature from an original signing server, in response to determining that the second signature is not present in the software;
    providing the signing server with an identifier of the software to be verified;
    responding to requests for information enabling verification of the software received from the signing server by sending the requested information comprising less than an entire code file or data set of the software to the signing server;
    receiving from the signing server the second verification method and the second signature for the software for use in verifying the software, wherein the second verification method is different than the first verification method and the second verification method comprises an executable command;
    appending the second verification method and the second signature to the first verification method and the first signature;
    storing the received second verification method and a second signature; and
    using the second verification method and second signature to verify the software.

13. The method of claim 12, wherein responding to requests for information related to the software includes sending a portion of the software to the signing server.

14. The method of claim 12, wherein providing the signing server with an identifier of the software to be verified includes providing a software identifier.

15. The method of claim 12, wherein providing the signing server with an identifier of the software to be verified includes providing a portion of the software.

16. The method of claim 12, wherein providing the signing server with an identifier of the software to be verified includes providing the first digital signature included with the software.

17. The method of claim 12, wherein providing the signing server with an identifier of the software to be verified includes providing a portion of the first digital signature included with the software.

18. The method of claim 12, wherein providing the signing server with an identifier of the software to be verified is performed in response to a request for a software identifier received from the signing server and the software identifier provided is responsive to the received request.

19. The method of claim 12, wherein responding to requests for information related to the software includes performing a hash function on the software and sending a result to the signing server.

20. The method of claim 12, wherein responding to requests for information related to the software includes identifying to the signing server resources accessed by the software.

21. The method of claim 12, wherein the received second verification method and second signature are stored in a second signature file associated with the software.

22. The method of claim 12, further comprising:
determining whether the second verification method and second signature is previously stored with the software; and
establishing a connection to the signing server if the second verification method and second signature is not previously stored with the software.

23. A server, comprising:
a processor;
a network interface circuit coupled to the processor; the network interface circuit configured to enable the processor to communicate via a network; and
a memory coupled to the processor, wherein the processor is configured with executable instructions to perform operations comprising:
receiving via the network interface circuit from a client computer a request for a second verification method and a second signature for software to be verified, the software to be verified having been previously distributed with a first verification method and a first signature from an original signing server, wherein the request for a second verification method and a second signature indicates that the second signature is not present in the software;
receiving via the network interface circuit from the client computer an identifier of the software to be verified;
sending via the network interface circuit requests for information enabling verification of the software from the client computer, the information comprising less than an entire code file or data set of the software;
determining whether the software to be verified is trustworthy based upon the information provided by the client computer; and
sending via the network interface circuit to the client computer the second verification method and the second signature for the software for use by the client computer in verifying the software, wherein the second verification method and the second signature are appended to the first verification method and the first signature, the second verification method is different than the first verification method, and the second verification method comprises an executable command.

24. The server of claim 23, wherein the processor is configured with executable instructions to perform operations further comprising:
requesting information from the client computer related to a user of the client computer.

25. The server of claim 23, wherein the processor is configured with executable instructions to perform operations further comprising:
sending via the network interface circuit to the client computer a request for an identifier for the software to be verified.

26. The server of claim 23, wherein the processor is configured with executable instructions to perform operations further comprising:
sending via the network interface circuit to the client computer a request for an identifier for the software to be verified that identifies a specific portion of the software to be returned as a software identifier.

27. The server of claim 23, wherein the processor is configured with executable instructions to perform operations further comprising:
sending via the network interface circuit to the client computer a request for the first digital signature of the software to be verified to be used as the identifier for the software.

28. The server of claim 23, wherein the processor is configured with executable instructions to perform operations further comprising:
sending via the network interface circuit to the client computer a request for an identifier for the software to be verified that identifies a specific portion of the first digital signature of the software to be used as the identifier for the software.

29. The server of claim 23, wherein the processor is configured with executable instructions to perform operations further comprising:
sending via the network interface circuit to the client computer requests for a portion of the software to be verified.

30. The server of claim 23, wherein the processor is configured with executable instructions to perform operations further comprising;
sending via the network interface circuit to the client computer a request to perform a hash function on the software to be verified and return a result to the server.

31. The server of claim 23, wherein the processor is configured with executable instructions to perform operations further comprising:
sending via the network interface circuit to the client computer a request to identify client computer resources accessed by the software to be verified.

32. The server of claim 23, wherein the second verification method includes a constant appended or prepended to the software before a hash function is applied to the software and the second signature is a signature resulting from applying the second verification method to the software to be verified.

33. The server of claim 23, wherein the processor is configured with executable instructions to perform operations further comprising:
accessing a data file using the received identifier of the software to be verified, the data file including information related to verifying the software, wherein:
the requests for information from the client computer related to the software to be verified includes requests for information identified in the accessed data file;
determining whether the software to be verified is trustworthy includes performing operations identified in the accessed data file; and obtaining the second verification method and second signature from the accessed data file.

34. The server of claim 33, wherein the memory has stored therein a countermeasures database, and the accessed data file is accessed from the countermeasures database.

35. A computer, comprising:
a processor;
a network interface circuit coupled to the processor; the network interface circuit configured to enable the processor to communicate via a network; and
a memory coupled to the processor, wherein the processor is configured with executable instructions to perform operations comprising:
  determining whether a second signature is present in software previously distributed with a first verification method and a first signature from an original signing server;
  sending via the network interface circuit to a signing server a request for a second verification method and second signature for software to be verified that has been previously distributed with a first verification method and a first signature from an original signing server, in response to a determination that the second signature is not present in the software;
  sending via the network interface circuit to the signing server an identifier of the software to be verified;
  responding to requests for information enabling verification of the software received via the network interface circuit from the signing server by sending the requested information comprising less than an entire code file or data set of the software to the signing server;
  receiving via the network interface circuit from the signing server the second verification method and server the second signature for the software to be verified for use in verifying the software, wherein the second verification method is different than the first verification method and the second verification method comprises an executable command;
  appending the second verification method and the second signature to the first verification method and the first signature;
  storing the received server the second verification method and server the second signature in the memory; and
  using the second verification method and the second signature to verify the software.

36. The computer of claim 35, wherein the processor is configured with executable instructions such that the operation of responding to requests for information related to the software to be verified includes a sending to the signing server via the network interface circuit a portion of the software.

37. The computer of claim 35, wherein the processor is configured with executable instructions such that the operation of sending the signing server an identifier of the software to be verified includes sending a software identifier.

38. The computer of claim 35, wherein the processor is configured with executable instructions such that the operation of sending the signing server an identifier of the software to be verified includes sending a portion of the software.

39. The computer of claim 35, wherein the processor is configured with executable instructions such that the operation of sending the signing server an identifier of the software to be verified includes sending the first digital signature included with the software.

40. The computer of claim 35, wherein the processor is configured with executable instructions such that the operation of sending the signing server an identifier of the software to be verified includes sending a portion of the first digital signature included with the software.

41. The computer of claim 35, wherein the processor is configured with executable instructions such that the operation of sending the signing server an identifier of the software to be verified is performed in response to a request for a software identifier received from the signing server and the software identifier sent to the signing server is responsive to the received request.

42. The computer of claim 35, wherein the processor is configured with executable instructions such that the operation of responding to requests for information related to the software to be verified includes performing a hash function on the software to be verified and sending a result to the signing server via the network interface circuit.

43. The computer of claim 35, wherein the processor is configured with executable instructions such that the operation of responding to requests for information related to the software to be verified includes identifying to the signing server resources accessed by the software.

44. The computer of claim 35, wherein the processor is configured with executable instructions such that the operation of responding to requests for information related to the software to be verified includes:
  receiving a request from the signing server for information regarding a user of the computer;
  prompting a user for the requested information;
  receiving a response from the user; and
  sending the user response to the signing server via the network interface connection.

45. The computer of claim 35, wherein the processor is configured with executable instructions to perform operations further comprising:
  storing the received second verification method and second signature in a second signature file associated with the software stored in the memory.

46. The computer of claim 35, wherein the processor is configured with executable instructions to perform operations further comprising:
  determining whether the second verification method and second signature is previously stored with the software; and
  establishing a connection to the signing server via the network interface circuit if the second verification method and second signature is not previously stored with the software.

47. A server, comprising:
means for receiving from a client computer a request for a second verification method and a second signature for software to be verified that has been previously distributed with a first verification method and a first signature from an original signing server, wherein the request for a second verification method and a second signature indicates that the second signature is not present in the software;
means for receiving from the client computer an identifier of the software to be verified;
means for requesting information enabling verification of the software from the client computer, the information comprising less than an entire code file or data set of the software;
means for determining whether the software to be verified is trustworthy based upon the information provided by the client computer; and
means for sending to the client computer the second verification method and the second signature for the software to be verified for use by the client computer in verifying the software, wherein the second verification method and second signature are appended to the first verification method and the first signature, the second verification method is different than the first verification method, and the second verification method comprises an executable command.

48. The server of claim 47, further comprising:
means for requesting information from the client computer related to a user of the client computer.

49. The server of claim 47, further comprising:
means for sending via the network interface circuit to the client computer a request for an identifier for the software to be verified.

50. The server of claim 47, further comprising:
means for sending via the network interface circuit to the client computer a request for an identifier for the software to be verified that identifies a specific portion of the software to be returned as a software identifier.

51. The server of claim 47, further comprising:
means for sending via the network interface circuit to the client computer a request for the first digital signature of the software to be verified to be used as the identifier for the software.

52. The server of claim 47, further comprising:
means for sending via the network interface circuit to the client computer a request for an identifier for the software to be verified that identifies a specific portion of the first digital signature of the software to be used as the identifier for the software.

53. The server of claim 47, further comprising:
means for requesting information from the client computer related to the software comprises means for requesting a portion of the software to be verified.

54. The server of claim 47, wherein the means for requesting information from the client computer related to the software comprises means for requesting the client computer to perform a hash function on the software to be verified and return a result.

55. The server of claim 47, wherein the means for requesting information from the client computer related to the software comprises means for requesting a list of client computer resources accessed by the software to be verified.

56. The server of claim 47, wherein the second verification method includes a constant appended or prepended to the software before a hash function is applied to the software and the second signature is a signature resulting from applying the second verification method to the software to be verified.

57. The server of claim 47, further comprising means for accessing a data file using the received identifier of the software, the data file including information related to verifying the software, wherein:
the means for requesting information from the client computer related to the software comprises means for requesting information identified in the accessed data file;
the means for determining whether the software to be verified is trustworthy comprise means for performing operations identified in the accessed data file; and
the means for sending to the client computer the second verification method and the second signature obtains the second verification method and second signature are obtained from the accessed data file.

58. A computer, comprising:
means for determining whether a second signature is present in software previously distributed with a first verification method and a first signature from an original signing server;
means for requesting from a signing server a second verification method and second signature for software to be verified that has been previously distributed with a first verification method and a first signature from an original signing server, in response to a determination that the second signature is not present in the software;
means for providing the signing server with an identifier of the software to be verified;
means for responding to requests for information enabling verification of the software received from the signing server by sending the requested information comprising less than an entire code file or data set of the software to the signing server;
means for receiving from the signing server the second verification method and the second signature for the software to be verified for use in verifying the software, wherein the second verification method is different than the first verification method and the second verification method comprises an executable command;
means for appending the second verification method and the second signature to the first verification method and the first signature;
means for storing the received the second verification method and the second signature; and
means for using the second verification method and the second signature to verify the software.

59. The computer of claim 58, wherein the means for responding to requests for information related to the software comprises means for sending a portion of the software to the signing server.

60. The computer of claim 58, wherein the means for providing the signing server with an identifier of the software sends a software identifier.

61. The computer of claim 58, wherein the means for providing the signing server with an identifier of the software includes means for providing the signing server with a portion of the software.

62. The computer of claim 58, wherein the means for providing the signing server with an identifier of the software includes means for providing the first digital signature included with the software.

63. The computer of claim 58, wherein the means for providing the signing server with an identifier of the software includes means for providing a portion of the first digital signature included with the software.

64. The computer of claim 58, wherein the means for providing the signing server with an identifier of the software includes:
means for receiving a request for a software identifier from the signing server; and
means for providing a software identifier to the signing server which is responsive to the received request.

65. The computer of claim 58, wherein the means for responding to requests for information related to the software comprises means for performing a hash function on the software and sending a result to the signing server.

66. The computer of claim 58, wherein the means for responding to requests for information related to the software comprises means for identifying to the signing server resources accessed by the software.

67. The computer of claim 58, wherein the means for responding to requests for information related to the software comprises:
  means for receiving a request from the signing server for information regarding a user of the computer;
  means for prompting the user for the requested information;
  means for receiving a response from the user; and
  means for sending the user response to the signing server.

68. The computer of claim 58, further comprising means for storing the received second verification method and the second signature in a second signature file associated with the software.

69. The computer of claim 58, further comprising:
  means for determining whether the second verification method and second signature is previously stored with the software; and
  means for establishing a connection to the signing server if the second verification
  method and second signature is not previously stored with the software.

70. A non-transitory computer-readable storage medium having stored thereon processor-executable instructions configured to cause a processor of a server to perform operations comprising:
  receiving from a client computer a request for a second verification method and a second signature for software to be verified that has been previously distributed with a first verification method and a first signature from an original signing server, wherein the request for a second verification method and a second signature indicates that the second signature is not present in the software;
  receiving from the client computer an identifier of the software to be verified;
  requesting information enabling verification of the software from the client computer, the information comprising less than an entire code file or data set of the software;
  determining whether the software to be verified is trustworthy based upon the information provided by the client computer; and
  sending to the client computer the second verification method and the second signature for the software for use by the client computer in verifying the software, wherein the second verification method and the second signature are appended to the first verification method and the first signature, the second verification method is different than the first verification method, and the second verification method comprises an executable command.

71. The non-transitory computer-readable storage medium of claim 70, wherein the stored processor-executable instructions are configured to cause the processor of the server to perform operations further comprising:
  requesting information from the client computer related to a user of the client computer.

72. The non-transitory computer-readable storage medium of claim 70, wherein the stored processor-executable instructions are configured to cause the processor of the server to perform operations further comprising:
  sending via the network interface circuit to the client computer a request for an identifier for the software to be verified.

73. The non-transitory computer-readable storage medium of claim 70, wherein the stored processor-executable instructions are configured to cause the processor of the server to perform operations further comprising:
  sending via the network interface circuit to the client computer a request for an identifier for the software to be verified that identifies a specific portion of the software to be returned as a software identifier.

74. The non-transitory computer-readable storage medium of claim 70, wherein the stored processor-executable instructions are configured to cause the processor of the server to perform operations further comprising:
  sending via the network interface circuit to the client computer a request for the first digital signature of the software to be verified to be used as the identifier for the software.

75. The non-transitory computer-readable tangible storage medium of claim 70, wherein the stored processor-executable instructions are configured to cause the processor of the server to perform operations further comprising:
  sending via the network interface circuit to the client computer a request for an identifier for the software to be verified that identifies a specific portion of the first digital signature of the software to be used as the identifier for the software.

76. The non-transitory computer-readable storage medium of claim 70, wherein the requested information related to the software to be verified includes a portion of the software.

77. The non-transitory computer-readable storage medium of claim 70, wherein the requested information related to the software to be verified includes results of a hash function performed on the software.

78. The non-transitory computer-readable storage medium of claim 70, wherein the requested information related to the software to be verified includes identification of client computer resources accessed by the software.

79. The non-transitory computer-readable tangible storage medium of claim 70, wherein the second verification method includes a constant appended or prepended to the software before a hash function is applied to the software and the second signature is a signature resulting from applying the second verification method to the software.

80. The non-transitory computer-readable storage medium of claim 70, wherein the stored processor-executable instructions are configured to cause the processor of the server to perform operations further comprising:
  accessing a data file using the received identifier of the software to be verified, the data file including information related to verifying the software, wherein:
  requesting information from the client computer related to the software to be verified includes requesting information identified in the accessed data file;
  determining whether the software to be verified is trustworthy includes performing operations identified in the accessed data file; and
  the second verification method and second signature are obtained from the accessed data file.

81. The non-transitory computer-readable storage medium of claim 80, wherein the non-transitory computer-readable storage medium has stored there on a countermeasures database, and wherein the accessed data file is accessed from the countermeasures database.

82. A non-transitory computer-readable storage medium having stored thereon processor-executable instructions configured to cause a processor of a computer to perform operations comprising:
  determining whether a second signature is present in software previously distributed with a first verification method and a first signature from an original signing server;

requesting from a signing server a second verification method and second signature for software to be verified that has been previously distributed with a first verification method and a first signature from an original signing server, in response to a determination that the second signature is not present in the software;

providing the signing server with an identifier of the software to be verified;

responding to requests for information enabling verification of the software received from the signing server by sending the requested information comprising less than an entire code file or data set of the software to the signing server;

receiving from the signing server the second verification method and the second signature for the software to be verified for use in verifying the software, wherein the second verification method is different than the first verification method and the second verification method comprises an executable command;

appending the second verification method and the second signature to the first verification method and the first signature;

storing the received the second verification method and the second signature; and using the second verification method and the second signature to verify the software.

83. The non-transitory computer-readable tangible storage medium of claim 82, wherein the stored processor-executable instructions are configured to cause the processor of the computer to perform operations such that responding to requests for information related to the software includes sending a portion of the software to the signing server.

84. The non-transitory computer-readable storage medium of claim 82, wherein the stored processor-executable instructions are configured to cause the processor of the computer to perform operations such that sending the signing server an identifier of the software to be verified includes sending a software identifier.

85. The non-transitory computer-readable storage medium of claim 82, wherein the stored processor-executable instructions are configured to cause the processor of the computer to perform operations such that sending the signing server an identifier of the software to be verified includes sending a portion of the software.

86. The non-transitory computer-readable storage medium of claim 82, wherein the stored processor-executable instructions are configured to cause the processor of the computer to perform operations such that sending the signing server an identifier of the software to be verified includes sending the first digital signature included with the software.

87. The non-transitory computer-readable storage medium of claim 82, wherein the stored processor-executable instructions are configured to cause the processor of the computer to perform operations such that sending the signing server an identifier of the software to be verified includes sending a portion of the first digital signature included with the software.

88. The non-transitory computer-readable storage medium of claim 82, wherein the stored processor-executable instructions are configured to cause the processor of the computer to perform operations such that sending the signing server an identifier of the software to be verified is performed in response to a request for a software identifier received from the signing server and the software identifier sent to the signing server is responsive to the received request.

89. The non-transitory computer-readable storage medium of claim 82, wherein the stored processor-executable instructions are configured to cause the processor of the computer to perform operations such that responding to requests for information related to the software includes performing a hash function on the software and sending a result to the signing server.

90. The non-transitory computer-readable storage medium of claim 82, wherein the stored processor-executable instructions are configured to cause the processor of the computer to perform operations such that responding to requests for information related to the software includes identifying to the signing server resources accessed by the software.

91. The non-transitory computer-readable storage medium of claim 82, wherein the stored processor-executable instructions are configured to cause the processor of the computer to perform further operations comprising:

receiving a request from the signing server for information regarding a user of the computer;

prompting the user for the requested information;

receiving a response from the user; and sending the user response to the signing server via the network interface connection.

92. The non-transitory computer-readable storage medium of claim 91, wherein the stored processor-executable instructions are configured to cause the processor of the computer to perform further operations comprising:

storing the received second verification method and second signature in a second signature file associated with the software.

93. The non-transitory computer-readable storage medium of claim 92, wherein the stored processor-executable instructions are configured to cause the processor of the computer to perform further operations comprising:

determining whether the second verification method and second signature is previously stored with the software to be verified; and establishing a connection to the signing server if the second verification method and second signature is not previously stored with the software to be verified.

94. A method for executing software after it has been distributed, comprising:

determining in a client computer whether there is a second signature previously stored with the software;

establishing, by the client computer, a connection to a signing server if there is no second signature previously stored with the software;

requesting, by the client computer, from a signing server a second verification method and the second signature for software to be verified that has previously been distributed with a first verification method and a first signature from an original signing server;

providing, by the client computer, the signing server with an identifier of the software to be verified;

requesting, by the signing server, information enabling verification of the software from the client computer, the information comprising less than an entire code file or data set of the software;

responding, by the client computer, to requests for the information received from the signing server;

determining in the signing server whether the software is trustworthy based upon the information received from the client computer;

sending, by the signing server, to the client computer the second verification method and the second signature for the software for use by the client computer in verifying the software, wherein the second verification method is different than the first verification method and the second verification method comprises an executable command;

receiving, by the client computer, from the signing server the second verification method and second signature;

appending the second verification method and the second signature to the first verification method and the first signature;

storing, by the client computer, the received second verification method and second signature in the second signature file; and using, by the client computer, the second verification method and second signature in the second signature file to verify the software.

95. A system, comprising:

a network;

at least one computing device coupled to the network; and a signing server coupled to the network, wherein the at least one computing device comprises:

a device processor;

a network interface circuit coupled to the device processor and to the network, the network interface circuit configured to enable the device processor to communicate via the network; and a memory coupled to the device processor, wherein the device processor is configured with software instructions to perform operations comprising:

determining whether a second signature is present in software that has been previously distributed with a first verification method and a first signature from an original signing server;

sending via the network interface circuit to a signing server a request for a second verification method and second signature for software to be verified that has been previously distributed with a first verification method and a first signature from an original signing server, in response to a determination that the second signature is not present in the software;

sending via the network to the signing server an identifier of the software to be verified;

responding to requests for information enabling verification of the software received via the network from the signing server, the information comprising less than an entire code file or data set of the software;

receiving via the network from the signing server the second verification method and the second signature for the software for use in verifying the software, wherein the second verification method is different than the first verification method and the second verification method comprises an executable command;

appending the second verification method and the second signature to the first verification method and the first signature;

storing the received second verification method and the second signature in the memory; and using the second verification method and the second signature to verify the software, and wherein the signing server comprises:

a server processor;

a server network interface circuit coupled to the server processor and to the network, the server network interface circuit configure to enable the server processor to communicate via the network; and a server memory coupled to the server processor, wherein the server processor is configured with software instructions to perform operations comprising:

receiving via the network from the at least one computing device the request for the second verification method and second signature for the software to be verified;

receiving via the network from the at least one computing device an identifier of the software to be verified;

sending via the network requests for the information enabling verification of the software from the at least one computing device;

determining whether the software to be verified is trustworthy based upon the information provided by the at least one computing device; and sending via the network to the at least one computing device the second verification method and the second signature for the software for use by the at least one computer device in verifying the software.

* * * * *